United States Patent
Qu et al.

(10) Patent No.: US 9,645,453 B2
(45) Date of Patent: May 9, 2017

(54) LIQUID CRYSTAL PANEL HAVING A PLURALITY OF FIRST COMMON ELECTRODES AND A PLURALITY OF FIRST PIXEL ELECTRODES ALTERNATELY ARRANGED ON A LOWER SUBSTRATE, AND DISPLAY DEVICE INCORPORATING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Yingying Qu, Beijing (CN); Honglin Zhang, Beijing (CN); Dan Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 82 days.

(21) Appl. No.: 14/369,492

(22) PCT Filed: Dec. 9, 2013

(86) PCT No.: PCT/CN2013/088864
§ 371 (c)(1),
(2) Date: Jun. 27, 2014

(87) PCT Pub. No.: WO2015/003457
PCT Pub. Date: Jan. 15, 2015

(65) Prior Publication Data
US 2015/0261053 A1    Sep. 17, 2015

(30) Foreign Application Priority Data

Jul. 9, 2013 (CN) .......................... 2013 1 0286895

(51) Int. Cl.
*G02F 1/141* (2006.01)
*G09G 3/36* (2006.01)
*G02F 1/1343* (2006.01)

(52) U.S. Cl.
CPC .... *G02F 1/134363* (2013.01); *G02F 1/13439* (2013.01); *G02F 2001/134318* (2013.01);
(Continued)

(58) Field of Classification Search
CPC ... G02F 1/134363; G02F 2001/134381; G02F 1/13624; G09G 3/3614; G09G 2300/0823
See application file for complete search history.

(56) References Cited

U.S. PATENT DOCUMENTS 4,333,708 A * 6/1982 Boyd .................... G02F 1/1391
349/128
9,291,812 B2 * 3/2016 Satoh .................. G02B 26/007
(Continued)

FOREIGN PATENT DOCUMENTS

CN    101196664 A    6/2008
CN    101256322 A    9/2008
(Continued)

OTHER PUBLICATIONS

Chinese Office Action dated May 4, 2015 issued in corresponding Chinese Application No. 201310286895.5.
(Continued)

*Primary Examiner* — Paisley L Arendt
(74) *Attorney, Agent, or Firm* — Nath, Goldberg & Meyer; Joshua B. Goldberg; Leonid D. Thenor

(57) ABSTRACT

The present invention provides a liquid crystal panel and a display device, the liquid crystal panel comprising: an upper substrate and a lower substrate disposed opposite each other; and a liquid crystal layer therebetween. A plurality of first common electrodes and a plurality of first pixel electrodes alternately arranged are formed on the lower substrate, and a plurality of second common electrodes or second pixel
(Continued)

electrodes are formed on the upper substrate. Positions where the plurality of second common electrodes or second pixel electrodes are formed correspond to positions where the plurality of first electrodes or first pixel electrodes are formed. According to technical solutions of the present invention, electric field distribution in liquid crystal layer of the liquid crystal panel may be improved, transmittance of the liquid crystal panel may be increased, and voltage of the pixel electrode corresponding to the maximum transmittance may be lowered.

8 Claims, 2 Drawing Sheets

(52) U.S. Cl.
CPC ............ *G02F 2001/134381* (2013.01); *G09G 2300/0823* (2013.01)

(56) References Cited

U.S. PATENT DOCUMENTS

2004/0263749 A1* 12/2004 Jeong ................ G02F 1/134363
349/141

2010/0091231 A1* 4/2010 Nishimura ........ G02F 1/134363
349/139
2012/0327346 A1* 12/2012 Tsai .................. G02F 1/134363
349/138
2013/0258255 A1* 10/2013 Fang ................. G02F 1/134363
349/96

FOREIGN PATENT DOCUMENTS

| | | |
|---|---|---|
| CN | 101718928 A | 6/2010 |
| CN | 101943815 A | 1/2011 |
| CN | 102654686 A | 9/2012 |
| CN | 103149719 A | 6/2013 |
| CN | 103383510 A | 11/2013 |
| CN | 203365866 U | 12/2013 |
| JP | 2011257655 A | 12/2011 |

OTHER PUBLICATIONS

Written Opinion of the International Searching Authority dated Apr. 23, 2014 issued in corresponding International Application No. PCT/CN2013/088864.

Search Report from corresponding international application No. PCT/CN2013/088864.

* cited by examiner

LIQUID CRYSTAL PANEL HAVING A PLURALITY OF FIRST COMMON ELECTRODES AND A PLURALITY OF FIRST PIXEL ELECTRODES ALTERNATELY ARRANGED ON A LOWER SUBSTRATE, AND DISPLAY DEVICE INCORPORATING THE SAME

This is National Phase Application filed under 35 U.S.C. 371 as a national stage of PCT/CN2013/088864, filed Dec. 9, 2013, claiming priority from Chinese Application No. 201310286895.5 filed Jul. 9, 2013, the content of each of which is hereby incorporated by reference in its entirety.

FIELD OF THE INVENTION

The present invention relates to the field of display technology, and particularly to a liquid crystal display panel and a display device.

BACKGROUND OF THE INVENTION

Thin film transistor liquid crystal display, or TFT-LCD for short, is commonly used due to its characteristics such as quick response, low driving voltage, excellent gray scale display, and so on. A TFT-LCD crystal panel comprises an array substrate and a color film substrate disposed opposite with each other, and a liquid crystal layer filled between the array substrate and the color film substrate. According to the difference in directions of driving liquid crystal electric filed, liquid crystal display devices may be classified into multiple modes including Twisted Nematic (TN) mode, Vertical Alignment (VA) mode, In-Plane Switching (IPS) mode and Advanced Super Dimension Switch (ADS) mode and so on. In the Twisted Nematic (TN) mode, liquid crystal is twisted as being applied with a voltage, and the extent to which liquid crystal is twisted is controlled by controlling the voltage so as to achieve the purpose of modulating transmittance (displaying gray scale). Since the optical anisotropy of liquid crystal molecules results in a defect of narrow viewing angle of a screen, the prior art proposes a liquid crystal driving mode capable of broadening the viewing angle, that is, the In-Plane Switching (IPS for short) mode. A liquid crystal display using such mode is also called transverse electric field mode thin film transistor liquid crystal display (IPS type TFT-LCD for short).

A structure of electrodes in a conventional IPS type TFT-LCD panel is illustrated in FIG. 1, in which both pixel electrodes 1 and common electrodes 2 are formed on the same surface of a lower substrate 4 (array substrate) of the TFT-LCD substrate, and no electrode is formed on an upper substrate 3 (color film substrate). After voltages are applied, since the pixel electrodes 1 and the common electrodes 2 are in the same plane, horizontal electric fields are formed in regions between the pixel electrodes 1 and the common electrodes 2, however, for regions right above the pixel electrodes 1 and the common electrodes 2, no horizontal electric field is formed therein, and accordingly, liquid crystal molecules in the regions cannot be rotated, such that lights cannot transmit through the regions, resulting in low transmittance of the liquid crystal panel.

SUMMARY OF THE INVENTION

The present invention provides a liquid crystal panel and a display panel to improve horizontal electric field of the liquid crystal display, increase transmittance, and lower the voltage of pixel electrode corresponding to the maximum transmittance.

According to the concept of the present invention, there provides a liquid crystal panel, comprising: an upper substrate; a lower substrate disposed opposite to the upper substrate; and a liquid crystal layer between the upper substrate and the lower substrate. A plurality of first common electrodes and a plurality of first pixel electrodes alternately arranged are formed on the lower substrate, and a plurality of second common electrodes are formed on the upper substrate at positions corresponding to positions where the plurality of first common electrodes are formed. Alternatively, a plurality of second pixel electrodes are formed on the upper substrate at positions corresponding to positions where the plurality of first pixel electrodes are formed.

According to an embodiment of the present invention, when the plurality of second common electrodes are formed on the upper substrate, voltages with opposite polarities may be applied to adjacent first common electrodes. Values of a voltage applied to the second common electrode and a voltage applied to the first common electrode corresponding to the second common electrode in position may be the same. Alternatively, when the plurality of second pixel electrodes are formed on the upper substrate, voltages with opposite polarities may be applied to adjacent first pixel electrodes. Values of a voltage applied to the second pixel electrode and a voltage applied to the first pixel electrode corresponding to the second pixel electrode in position are the same.

According to an embodiment of the present invention, a plurality of second common electrodes and a plurality of second pixel electrodes alternately arranged may be formed on the upper substrate. Positions where the plurality of second common electrodes are formed may correspond to positions where the plurality of first common electrodes are formed, and positions where the plurality of second pixel electrodes are formed may correspond to positions where the plurality of first pixel electrodes are formed.

According to an embodiment of the present invention, values of a voltage applied to the second common electrode and a voltage applied to the first common electrode corresponding to the second common electrode in position may be the same. Values of a voltage applied to the second pixel electrode and a voltage applied to the first pixel electrode corresponding to the second pixel electrode in position may be the same.

According to an embodiment of the present invention, voltages applied to adjacent first pixel electrodes may have the same polarity, and voltages applied to adjacent second pixel electrodes may have the same polarity. Alternatively, voltages applied to adjacent first pixel electrodes may have opposite polarities, and voltages applied to adjacent second pixel electrodes may have opposite polarities.

According to an embodiment of the present invention, the first common electrode, the second common electrode, the first pixel electrode and the second pixel electrode may be bar-like electrodes. The first common electrode, the second common electrode, the first pixel electrode and the second pixel electrode may have a width of 4.6~5.2 μm. A distance between the first common electrode and the first pixel electrode adjacent with each other may be 1.8~3.4 μm, and a distance between the second common electrode and the second pixel electrode adjacent with each other may be 1.8~3.4 μm.

The liquid crystal panel according to the present invention may be applied to various display devices.

The liquid crystal panel and the display device may improve electric field distribution in the liquid crystal layer of the liquid crystal panel, increase the transmittance of the liquid crystal panel, and lower the voltage of the pixel electrode corresponding to the maximum transmittance.

DETAILED DESCRIPTION OF THE EMBODIMENTS

For better understanding of technical solutions of the present invention by those skilled in the art, a liquid crystal panel provided by the present invention will be further described in details with reference to the accompanying drawings.

Figure 1:
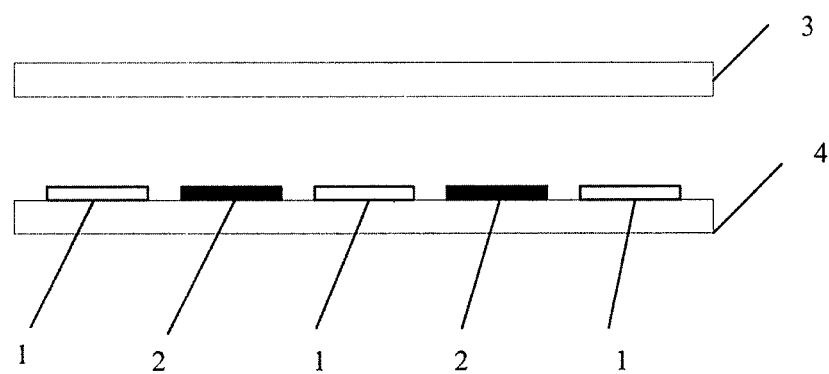
FIG. 1 is a schematic diagram illustrating a structure of an IPS type liquid crystal panel of the prior art.

Referring to FIG. 1, both pixel electrodes 1 and common electrodes 2 are formed on the lower substrate 4 (array substrate), and no electrode is formed on the upper substrate 3 (color film substrate). After voltages are applied, horizontal electric fields are formed in regions between the pixel electrodes 1 and the common electrodes 2. However, no horizontal electric field is formed in regions right above the pixel electrodes 1 and the common electrodes 2, and accordingly, liquid crystal molecules in such regions cannot be rotated, such that lights cannot transmit through the regions, resulting in low transmittance of the liquid crystal panel. In general, the transmittance of an existing IPS type liquid crystal display device is merely about 78% of that of a TN mode liquid crystal display device.

The concept of the present invention is proposed to solve the above technical problem. A liquid crystal panel according to an embodiment of the present invention may comprise an upper substrate and a lower substrate disposed opposite with each other, and a liquid crystal layer therebetween. A plurality of first common electrodes and a plurality of first pixel electrodes alternately arranged are formed on the lower substrate. On the upper substrate, a plurality of second common electrodes (or a plurality of second pixel electrodes), or a plurality of second common electrodes and a plurality of second pixel electrodes alternately arranged are formed. Once voltages are applied, horizontal electric fields may be formed between the first common electrodes and the first pixel electrodes on the lower substrate, and auxiliary horizontal electric fields may be formed between the second common electrodes (or second pixel electrodes) on the upper substrate, or horizontal electric fields may also be formed between the second common electrodes and the second pixel electrodes on the upper substrate. The transmittance of a liquid crystal panel with such electrode structure can be improved substantially, and the voltage of the pixel electrode corresponding to the maximum transmittance is lowered significantly.

Figure 2:
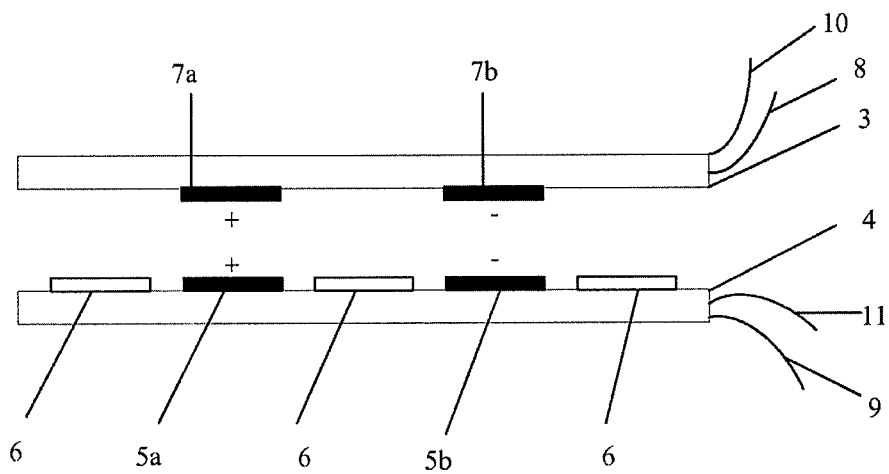
FIG. 2 is a schematic diagram illustrating a structure of a liquid crystal panel according to an embodiment of the present invention.

FIG. 2 is a schematic diagram illustrating a structure of a liquid crystal panel according to an embodiment of the present invention. Referring to FIG. 2, the liquid crystal panel comprises an upper substrate 3 and a lower substrate 4 disposed opposite with each other, and a liquid crystal layer (not illustrated in the figure) therebetween. A plurality of first common electrodes 5a, 5b and a plurality of first pixel electrodes 6 alternately arranged are formed on a side of the lower substrate 4 facing the upper substrate 3, and a plurality of second common electrodes 7a, 7b are formed on a side of the upper substrate 3 facing the lower substrate 4. Positions where the second common electrodes 7a, 7b are formed correspond to positions where the first common electrodes 5a, 5b are formed, respectively.

Specifically, the plurality of second common electrodes 7a, 7b and the plurality of first common electrodes 5a, 5b are disposed in one-to-one correspondence with each other, and have the same area. Preferably, the second common electrodes 7a, 7b are disposed at positions where the orthographic projections of the first common electrodes 5a, 5b on the upper substrate 3 are located, and the second common electrodes 7a, 7b and the first common electrodes 5a, 5b have the same shape and the same area.

According to an embodiment of the present invention, the widths of the first common electrode 5a, 5b, the second common electrode 7a, 7b and the first pixel electrode 6 may be 4.6~5.2 µm, and the distance between the first common electrode 5a, 5b and the first pixel electrode 6 adjacent with each other may be 1.8~3.4 µm.

According to the present embodiment, voltages with opposite polarities are applied to adjacent first common electrodes 5a and 5b, and the values of voltage applied to the second common electrode 7a, 7b and the voltage applied to the first common electrode 5a, 5b corresponding to the second common electrode in position are the same. The first common electrode 5a, 5b, the second common electrode 7a, 7b and the first pixel electrode 6 are bar-like and have the same area.

Specifically, voltages applied to adjacent first common electrodes 5a and 5b have different magnitudes and different polarities, for example, the voltage applied to the first common electrode 5a may be $+V_1$, and the voltage applied to the first common electrode 5b may be $-V_2$. Voltages applied to adjacent second common electrodes 7a and 7b have different magnitudes and different polarities, for example, the voltage applied to the second common electrode 7a may be $+V_1$, and the voltage applied to the second common electrode 7b may be $-V_2$. Furthermore, values of voltages applied to the second common electrodes 7a, 7b are equal to those of voltages applied to the first common electrodes 5a, 5b corresponding to the respective second common electrodes in position. For example, the voltages applied to the second common electrode 7a and to the first common electrode 5a corresponding to the second common electrode 7a in position may be $+V_1$, and the voltages applied to the second common electrode 7b and to the first common electrode 5b corresponding to the second common electrode 7b in position may be $-V_2$. According to such configuration, auxiliary horizontal electric fields may be formed between adjacent first common electrodes 5a and 5b on the lower substrate 4, and auxiliary horizontal electric fields may also be formed between adjacent second common electrodes 7a and 7b on the upper substrate 3 at the same time, thus improving the electric field distribution in the liquid crystal layer of the liquid crystal panel, improving the transmittance of the liquid crystal panel, and lowering the voltage of the pixel electrode corresponding to the maximum transmittance.

According to an embodiment of the present invention, the plurality of first common electrodes 5a, 5b and the plurality of first pixel electrodes 6 alternately arranged are formed on the lower substrate 4, and the plurality of second common electrodes 7a, 7b are formed on the upper substrate 3. Based on such configuration, the first common electrodes 5a, 5b and the first pixel electrodes 6 on the lower substrate 4 are alternately arranged, therefore, during operation of the liquid crystal panel, horizontal electric fields may be formed between adjacent electrodes (i.e. the first common electrode and the first pixel electrode) on the lower substrate 4 while the liquid crystal panel is operating, in the meanwhile, since the plurality of second common electrodes 7a, 7b are disposed on the upper substrate 3, and voltages applied to the adjacent second common electrodes 7a and 7b have different magnitudes and different polarities, auxiliary horizontal electric fields may be formed between adjacent electrodes (i.e. adjacent second common electrodes 7a and 7b) on the upper substrate 3, and auxiliary horizontal electric fields may also be formed between adjacent first common electrodes 5a and 5b on the lower substrate 4. Consequently, the liquid crystal panel according to the present invention not only possesses benefits of the existing IPS mode, but also improves the transmittance of the liquid crystal layer by generating parallel electric fields to rotate liquid crystal molecules between and right above the electrodes in a direction parallel to the substrates. The maximum transmittance of the liquid crystal panel of the existing IPS mode is about 78%, and the voltage of the pixel electrode corresponding to the maximum transmittance is about 8.5V. According to the present invention, the maximum transmittance of the liquid crystal panel is about 83.18%, and the voltage of the pixel electrode corresponding to the maximum transmittance is about 7 V, and for this reason, the liquid crystal panel according to the present embodiment holds an advantage over the liquid crystal panel of the traditional IPS mode.

Moreover, the liquid crystal panel according to the present embodiment may further comprise a connecting line 8 and a connecting line 10 connected to the second common electrodes 7a and 7b, respectively, as well as a connecting line 9 and a connecting line 11 connected to the first common electrodes 5a and 5b, respectively.

It should be appreciated that, only structures differing from those of the liquid crystal panel of the prior art are illustrated in the embodiments of the present invention, however, in practice, the liquid crystal panel according to an embodiment of the present invention may further comprise the same structures and configurations as the liquid crystal panel of the prior art. For example, the liquid crystal panel according to an embodiment of the present invention may comprise a plurality of gate lines, a plurality of data lines, and a plurality of common electrode lines, wherein the gate lines and data lines divide the liquid crystal panel into multiple pixel units, each of which may comprises a pixel electrode, a common electrode connected to the common electrode line, and a thin film transistor comprising a gate connected to the gate line, a gate insulation layer, and a source connected to the data line and a drain connected to the pixel electrode.

In the liquid crystal panel according to the present embodiment, the plurality of first common electrodes and the plurality of first pixel electrodes alternately arranged are formed on the lower substrate, and the plurality of second common electrodes are formed on the upper substrate. By disposing the second common electrodes on the upper substrate and applying voltages to the second common electrodes with the voltages applied to adjacent second common electrodes being opposite in polarity, auxiliary horizontal electric fields may be formed so as to improve the electric field distribution in the liquid crystal layer of the liquid crystal panel, increase the transmittance of the liquid crystal panel, and lower the voltage of the pixel electrode corresponding to the maximum transmittance in the meanwhile.

In addition, although the embodiment in which the plurality of second common electrodes 7a, 7b are formed on the upper substrate 3 is illustrated by referring to FIG. 2, it will be appreciated by those skilled in the art from the teaching of the present invention that, alternatively, a plurality of second pixel electrodes may be formed on the upper substrate 3 at positions corresponding to the positions where the first pixel electrodes 6 are formed, instead of the implementation illustrated in FIG. 2.

When a plurality of second pixel electrodes are formed on the substrate 3, voltages applied to adjacent first pixel electrodes 6 may have opposite polarities. Furthermore, values of voltage applied to the second pixel electrode and the first pixel electrode corresponding to the second pixel electrode in position may be the same. According to such configuration, auxiliary horizontal electric fields may also be formed so that the liquid crystal panel according to present invention not only possess benefits of the existing IPS mode but also improves the transmittance of the liquid crystal layer by generating parallel electric fields to rotate liquid crystal molecules between and right above the electrodes in a direction parallel to the substrates.

Figure 3:
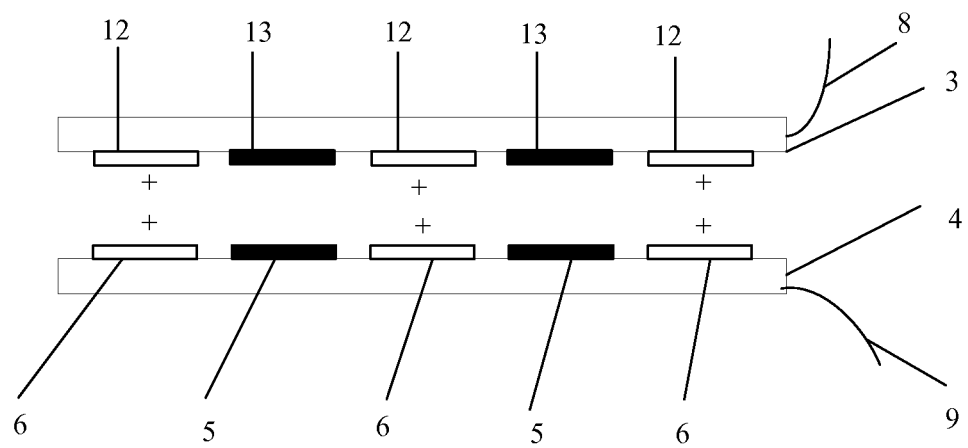
FIG. 3 is a schematic diagram illustrating a structure of a liquid crystal panel according to another embodiment of the present invention.

FIG. 3 is a schematic diagram illustrating a structure of a liquid crystal panel according to another embodiment of the present invention. Referring to FIG. 3, the liquid crystal panel comprises an upper substrate 3 and a lower substrate 4 disposed opposite with each other, and a liquid crystal layer (not illustrated in the figure) therebetween. A plurality of first common electrodes 5 and a plurality of first pixel electrodes 6 alternately arranged are formed on a side of the lower substrate 4 facing the upper substrate 3, and a plurality of second common electrodes 13 and a plurality of second pixel electrodes 12 alternately arranged are formed on a side of the upper substrate 3 facing the lower substrate 4. The positions where the second common electrodes 13 and the second pixel electrodes 12 are formed correspond to the positions where the first common electrodes 5 and the first pixel electrodes 6 are formed, respectively.

Compared to the embodiment illustrated in FIG. 2, in the embodiment illustrated in FIG. 3, the plurality of second pixel electrodes 12 are further formed on the upper substrate 3 at positions corresponding to the positions where the plurality of first pixel electrodes 6 are formed.

Specifically, the plurality of second common electrodes 13 and the plurality of first common electrodes 5 are disposed in one-to-one correspondence with each other, and the plurality of second pixel electrodes 12 and the plurality of first pixel electrodes 6 are disposed in one-to-one correspondence with each other. Preferably, the second common electrodes 13 are disposed at positions where the orthographic projections of the first common electrodes 5 on the upper substrate 3 is located, and the second common electrodes 13 and the first common electrodes 5 have the same shape and the same area; the second pixel electrodes 12 are disposed at positions where the orthographic projections of the first pixel electrodes 5 on the upper substrate 3 is located, and the second pixel electrodes 12 and the first pixel electrodes 6 have the same shape and the same area.

According to an embodiment of the present invention, the first common electrode 5, the second common electrode 13, the first pixel electrode 6 and the second pixel electrode 12 are bar-like electrodes, have the same area, and may have a width of 4.6~5.2 μm, and both the distance between the first common electrode 5 and the first pixel electrode 6 adjacent with each other and the distance between the second common electrode 13 and the second pixel electrode 12 adjacent with each other may be 1.8~3.4 μm.

According to the present embodiment, voltages with the same polarity are applied to adjacent first pixel electrodes 6, and voltages with the same polarity are applied to adjacent second pixel electrodes 12. According to such configuration, during operation of the liquid crystal panel, horizontal electric fields may be formed between adjacent electrodes on both the upper substrate 3 and the lower substrate 4, namely, horizontal electric fields may be formed between the first pixel electrodes 5 and the first common electrodes 6, and horizontal electric fields may be formed between the second pixel electrodes 12 and the second common electrodes 13, and thus the liquid crystal panel according to the present invention not only possesses benefits of the existing IPS mode, but also improves the transmittance of the liquid crystal layer by rotating liquid crystal molecules between the electrodes in the direction parallel to the substrates. According to the present embodiment, the maximum transmittance of the liquid crystal panel is about 78.59%, and the voltage of the pixel electrode corresponding to the maximum transmittance is about 6.2 V, and for this reason, the liquid crystal panel according to the present embodiment holds an advantage over that of the traditional IPS mode.

Furthermore, the liquid crystal panel according to the present embodiment may further include a connecting line 8 connected to the second common electrodes 13 and a connecting line 9 connected to the first common electrodes 5.

In the liquid crystal panel according to the present embodiment, the plurality of first common electrodes and the plurality of first pixel electrodes alternately arranged are formed on the lower substrate, and the plurality of second common electrodes and the plurality of second pixel electrodes alternately arranged are formed on the upper substrate. By disposing the second common electrodes and the second pixel electrodes on the upper substrate and applying voltages thereto, the electric field distribution in the liquid crystal layer of the liquid crystal panel may be improved, the transmittance of the liquid crystal panel may be increased, and the voltage of the pixel electrode corresponding to the maximum transmittance may be lowered.

Figure 4:
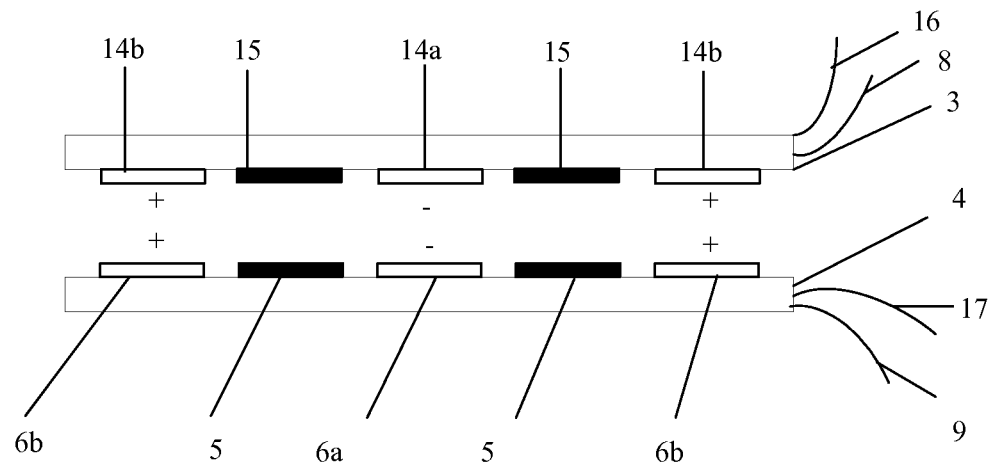
FIG. 4 is a schematic diagram illustrating a structure of a liquid crystal panel according to still another embodiment of the present invention.

FIG. 4 is a schematic diagram illustrating a structure of a liquid crystal panel according to still another embodiment of the present invention. Referring to FIG. 4, the liquid crystal panel comprises an upper substrate 3 and a lower substrate 4 disposed opposite with each other, and a liquid crystal layer (not illustrated in the figure) therebetween. A plurality of first common electrodes 5 and a plurality of first pixel electrodes 6a, 6b alternately arranged are formed on a side of the lower substrate 4 facing the upper substrate 3, and a plurality of second common electrodes 15 and a plurality of second pixel electrodes 14a, 14b alternately arranged are formed on a side of the upper substrate 3 facing the lower substrate 4. The positions where the second common electrodes 15 and the second pixel electrodes 14a, 14b are formed correspond to the positions where the first common electrodes 5 and the first pixel electrodes 6 are formed, respectively.

According to the present embodiment, voltages with opposite polarities are applied to adjacent first pixel electrodes 6a and 6b, and voltages with opposite polarities are applied to adjacent second pixel electrodes 14a and 14b. According to such configuration, during the operation of the liquid crystal panel, auxiliary horizontal electric fields may be formed between adjacent second pixel electrodes 14a and 14b on the upper substrate 3, and auxiliary horizontal electric fields may also be formed between adjacent first pixel electrodes 6a and 6b, and thus the liquid crystal panel according to the present invention not only possesses benefits of the existing IPS mode, but also improves the transmittance of the liquid crystal layer by generating parallel electric fields to rotate liquid crystal molecules between and right above the electrodes in the direction parallel to the substrates. According to the present embodiment, the maximum transmittance of the liquid crystal panel is about 81.26%, and the voltage of the pixel electrode corresponding to the maximum transmittance is about 5.6 V, and for this reason, the liquid crystal panel according to the present embodiment holds an advantage over that of the traditional IPS mode.

Compared to the embodiment illustrated in FIG. 3, in the embodiment illustrated in FIG. 4, both the first pixel electrodes and the second pixel electrodes are divided into positive electrodes and negative electrodes, so that auxiliary horizontal electric fields may be formed between pixel electrodes, horizontal electric field region is further enlarged, thus further improving the transmittance.

In addition, the liquid crystal panel according to the present embodiment may further include a connecting line 8 and a connecting line 16 respectively connected to the second pixel electrodes 14a and 14b, as well as a connecting line 9 and a connecting line 17 respectively connected to the first pixel electrodes 6a and 6b.

In the liquid crystal panel according to the present embodiment, the plurality of first common electrodes and the plurality of first pixel electrodes alternately arranged are formed on the lower substrate, and the plurality of second common electrodes and the plurality of second pixel electrodes alternately arranged are formed on the upper substrate. By disposing the second common electrodes and the second pixel electrodes on the upper substrate and applying voltages to the first and second pixel electrodes with the voltages applied to adjacent first pixel electrodes being opposite in polarity and the voltages applied to adjacent first second electrodes being opposite in polarity, auxiliary horizontal electric fields may be formed so as to improve the electric field distribution in the liquid crystal layer of the liquid crystal panel, increase the transmittance of the liquid crystal panel, and lower the voltage of the pixel electrode corresponding to the maximum transmittance in the meanwhile.

The liquid crystal panel according to the embodiments of the present invention may be applied to various display devices, which may be any product or component with display function such as a cell phone, a tablet, a TV, a monitor, a notebook computer, a digital photo frame, a navigator and the like.

It should be understood that above implementations are merely exemplary implementations used to explain the principle of the present invention, however, the present invention are not limited thereto. Various modifications and improvements may be made by those skilled in the art without departing from the spirit and substance of the present invention, and such modifications and improvements are also deemed as the protection scope of the present invention.

The invention claimed is:

1. A liquid crystal panel, comprising
an upper substrate;
a lower substrate disposed opposite to the upper substrate; and
a liquid crystal layer between the upper substrate and the lower substrate,
wherein, a plurality of first common electrodes and a plurality of first pixel electrodes alternately arranged are formed on the lower substrate, and
a plurality of second common electrodes are formed on the upper substrate at positions corresponding to positions where the plurality of first common electrodes are formed, and
a plurality of second pixel electrodes are formed on the upper substrate at positions corresponding to positions where the plurality of first pixel electrodes are formed,
wherein applied voltages to adjacent first pixel electrodes have opposite polarities, and
applied voltages to adjacent second pixel electrodes have opposite polarities.

2. The liquid crystal panel according to claim 1, wherein, values of a voltage applied to the second common electrodes and a voltage applied to the first common electrodes corresponding to the second common electrodes in position are the same, and/or
values of a voltage applied to the second pixel electrodes and a voltage applied to the first pixel electrodes corresponding to the second pixel electrodes in position are the same.

3. The liquid crystal panel according to claim 1, wherein, the first common electrodes, the second common electrodes, the first pixel electrodes and the second pixel electrodes are bar-like electrodes.

4. The liquid crystal panel according to claim 1, wherein,
the first common electrodes, the second common electrodes, the first pixel electrodes and the second pixel electrodes have a width of 4.6~5.2 μm, and
a distance between one of the first common electrodes and one of the first pixel electrodes adjacent with each other is 1.8~3.4 μm, and a distance between one of the second common electrodes and one of the second pixel electrodes adjacent with each other is 1.83~3.4 μm.

5. A display device, comprising the liquid crystal panel according to claim 1.

6. The display device according to claim 5, wherein,
values of a voltage applied to the second common electrodes and a voltage applied to the first common electrodes corresponding to the second common electrodes in position are the same, and/or
values of a voltage applied to the second pixel electrodes and a voltage applied to the first pixel electrodes corresponding to the second pixel electrodes in position are the same.

7. The display device according to claim 5, wherein, the first common electrodes, the second common electrodes, the first pixel electrodes and the second pixel electrodes are bar-like electrodes.

8. The display device according to claim 5, wherein,
the first common electrodes, the second common electrodes, the first pixel electrodes and the second pixel electrodes have a width of 4.6~5.2 μm, and
a distance between one of the first common electrodes and one of the first pixel electrodes adjacent with each other is 1.8~3.4 μm, and a distance between one of the second common electrodes and one of the second pixel electrodes adjacent with each other is 1.8~3.4 μm.

* * * * *